UNITED STATES PATENT OFFICE.

GEORGE G. ROCKWOOD, OF NEW YORK, N. Y.

PROCESS OF PRODUCING HALF-TONE NEGATIVES.

SPECIFICATION forming part of Letters Patent No. 649,954, dated May 22, 1900.

Application filed March 17, 1900. Serial No. 9,124. (No specimens.)

*To all whom it may concern:*

Be it known that I, GEORGE G. ROCKWOOD, a citizen of the United States, and a resident of New York, in the county of New York and State of New York, have invented certain new and useful Improvements in Processes of Producing Screen Negatives for Use in Making Photographic Half-Tone Printing-Plates, of which the following is a specification.

My invention relates to the art of making photographic half-tone printing-plates; and the object of my invention is to shorten the various stages of the process for producing said plates, so that the proceeding from the exposure of the negative to the completion of the engraved or etched plate may be made within a few minutes and better results be obtained than by the present existing method.

In the process of making photographic half-tone printing-plates as at present practiced the initial negative is developed on a gelatin dry-plate, and this developed plate is then dried. The drying of this plate consumes from half an hour to an hour when mechanical means are employed to accomplish it and from ten to twelve hours when the plate is dried spontaneously. A print is then made from said negative on photographic paper and toned, fixed, and mounted on cardboard or stretcher, usually occupying several hours. The "screen" negative is then made from said paper print, and when made the film bearing said negative is first floated off its plate, then turned over, and finally floated onto another glass plate in order to reverse the image of the negative prior to its being printed on the sensitized zinc plate and etched.

My invention consists in the process of producing a screen negative for use in making a photographic half-tone printing-plate, which comprises, first, surface-drying the initial dry-plate negative, then photographically making a wet-plate positive image on glass from said initial dry-plate negative, and then photographically making a screen negative from the reversed plate bearing said positive image.

In carrying out my invention I first take the initial negative, which is a gelatin dry-plate negative, and by means of a piece of blotting-paper applied to its surface take up the drops or "tears" therefrom in a very few moments, when the said negative is in condition to be presented to the camera. I then by means of a camera photograph by the collodion or wet process a positive image upon a glass plate from said initial negative. The plate bearing this positive image after drying, which is effected in a few moments by heat, is then reversed in a camera and a screen negative is photographically made therefrom. The screen negative thus produced may now be printed upon the sensitized zinc plate, and the positive image thus imprinted on said plate may be immediately etched.

The performance of the entire process of producing the screen negative need not consume more than a few minutes of time, and the production of the etched plate ready to print from can be made in a like short space of time.

In addition to the economy in time and labor resulting from my described process other and further advantages are thereby secured. For instance, the glass plate bearing the positive image photographed from the initial negative being free from the grain of a photographic print on paper, the said positive image may be an enlargement photographically of said initial negative image, so that a small "snap-shot" negative of, say, two by three inches can, as soon as developed, be photographically enlarged up to eleven by fourteen inches, or in some instances to even greater dimensions in said positive image. The said resulting positive image will be an image only and free from texture or grain of paper. Again, the possible injury to or distortion of a delicate and elastic film in reversing the said positive image, which is liable to occur in floating off from its plate the film bearing said positive image, turning said film over, and then floating it onto another plate, as is done in the process of producing screen negatives for use in making half-tone printing-plates, is wholly avoided. Furthermore, a "hard" undertimed initial negative, which would not make a good paper print, can be softened by the proper exposure in the camera and a good brilliant positive image on glass be obtained, while a soft or overexposed initial negative, unless for printing on paper, can be made to give a brilliant positive on glass in the manner described.

What I claim as my invention, and desire to secure by Letters Patent, is—

The process of producing a screen negative for use in making a photographic half-tone printing-plate, which consists in first surface-drying the initial dry-plate negative, then photographically making a wet-plate positive image on glass from said initial dry-plate negative, and then photographically making a screen negative from the reversed plate bearing said positive image; substantially as and for the purpose specified.

Signed at New York city, in the county of New York and State of New York, this 19th day of February, A. D. 1900.

GEORGE G. ROCKWOOD.

Witnesses:
ARDEN S. FITCH,
J. O'CONNOR.